United States Patent [19]

Schroeder

[11] Patent Number: 4,458,269

[45] Date of Patent: Jul. 3, 1984

[54] SAMPLING ARRANGEMENT FOR A TELEVISION GHOST SIGNAL CANCELLATION SYSTEM

[75] Inventor: Alfred C. Schroeder, Newtown, Pa.

[73] Assignee: RCA Corporation, New York, N.Y.

[21] Appl. No.: 252,817

[22] Filed: Apr. 10, 1981

Related U.S. Application Data

[62] Division of Ser. No. 147,629, May 7, 1980, Pat. No. 4,314,277.

[51] Int. Cl.³ .............................................. H04N 5/21
[52] U.S. Cl. .................................................. 358/167
[58] Field of Search .......................... 358/167, 905, 36; 455/303, 305, 306, 307; 333/165, 166

[56] References Cited

U.S. PATENT DOCUMENTS 3,935,536  1/1976  Kimura et al.
4,127,874  11/1978 Iwasawa et al.
4,314,277  2/1982  Pritchard et al. .................... 358/167

OTHER PUBLICATIONS

"A Tutorial on Ghost Cancelling in Television Systems" by W. Ciciora, from IEEE Trans. on C.E., vol. CE-25, Feb. 1979, at pp. 9-44, FIGS. 15, 19, 20 and 21.
"A Fully Automatic Ghost Canceller" by S. Makino et al., Published in the IEEE Transactions on Consumer Electronics, vol. CE-24, No. 3, 1978 pp. 267-271.

Primary Examiner—John C. Martin
Attorney, Agent, or Firm—E. M. Whitacre; P. J. Rasmussen; P. M. Emanuel

[57] ABSTRACT

A ghost signal sampling arrangement is provided which includes a gate coupled to receive a ghost contaminated video signal. The gate passes a portion of the video signal including a main signal component available for use as a training signal and its corresponding ghost signal components. The gated signal portion is applied to a differentiator, which passes a first signal corresponding to the training signal, and subsequent signals corresponding to the ghost signal components when present. A clipping limiter is coupled to receive the signals produced by the differentiator, and produces a sampling signal corresponding to the first, training signal component, to the exclusion of the ghost signal components. A serial shift register is coupled to receive the sampling signal, which passes through the shift register and appears at sequential ones of its parallel outputs. A plurality of sampling circuits each have a control input coupled to respectively different outputs of the shift register, and a signal input coupled to the output of the differentiator. The sampling circuits sample the signal at the output of the differentiator in response to the application of a sampling signal at their respective inputs, thereby developing a time sequence of samples of the differentiator output signal. These samples may be applied to weighting function circuits for the development of weighting function signals for a ghost eliminator.

6 Claims, 4 Drawing Figures

SAMPLING ARRANGEMENT FOR A TELEVISION GHOST SIGNAL CANCELLATION SYSTEM

This is a divisional application of U.S. Application No. 147,629 filed May 7, 1980, entitled "INPUT-WEIGHTED TRANSVERSAL FILTER TV GHOST ELIMINATOR", now Pat. No. 4,314,277.

This invention relates to television signal ghost eliminators and, in particular, to a television signal ghost eliminator which employs an input-weighted transversal filter in a recursive system.

A common source of television signal interference is ghost images resulting from the reception of delayed replicas of the transmitted television signal. The ghost image generally results from the reception of a signal which has been reflected from a building or other object, with the path of the reflected signal being different than the direct path of the main signal. The received reflected signal is usually of a lesser amplitude than the main signal and is delayed in time relative to the main signal, and thus may be of any phase relationship with respect to the main signal. The displayed ghost signal can therefore be of varying intensity and polarity with respect to the desired signal image.

The problem of ghosts is not confined to signals received by a television antenna, but can frequently occur in cable television systems due to improper termination of cables. Signal reflections can then occur in the transmission line, which are a source of ghost interference. In addition, misalignment within the signal processing path of the receiver itself can be a source of ghost interference. Such internally generated ghosts can even be processed and displayed prior to the occurrence of the main signal resulting in a leading rather than a delayed, ghost image.

A basic ghost cancellation technique of the prior art comprises a delay line and a subtractor network inserted in the signal processing path subsequent to video signal detection. The main signal is delayed by the delay line in parallel with the undelayed signal path, by the same time that the ghost signal is delayed with respect to the main signal. The ghost signal is then subtracted from the delayed main signal, with the delayed main signal aligned in time with the ghost signal, so that the ghost is cancelled. However, the delayed signal will also introduce a new ghost into the main signal known as a residual ghost, which is reduced in amplitude with respect to the original ghost and delayed from the main signal by twice the delay time of the original ghost.

The residual ghost may be cancelled in the same manner as the original ghost. However, cancellation of the residual ghost in the manner described above will result in the creation of a residual of the residual ghost. Moreover, the cancellation of residual ghosts as described above adds additional complexity to the ghost cancellation system.

An improved ghost cancellation technique which does not create residual ghosts is the recursive ghost canceller. In a system using this technique, the ghost is detected and the main signal, including the ghost, is sampled. The samples are weighted and summed to develop a pseudo-ghost which is of opposite polarity to the original ghost. The pseudo-ghost is then fed back and added to the main signal to eliminate the original ghost. In this typical recursive ghost canceller, a delay line is used to develop the pseudo-ghost signal. The main signal, including the ghost, is applied to the input of the delay line and samples of the signal are taken from taps on the delay line, the taps being characterized as output taps. The output tapped signals are weighted and summed to develop the pseudo-ghost signal. Alternatively, the main signal may be sampled and the samples applied in weighted fashion to input taps of a delay line. The weighted samples are then summed in the delay line to develop the pseudo-ghost signal.

In order to prevent the ghost canceller from oscillating, the loop gain of the taps in the system must be carefully controlled so as not to exceed unity. This is generally accomplished by limiting the maximum output of integrators in series with the weighted samples and the delay line taps. The outputs of the integrators must maintain a steady state value between successive update periods.

The recursive ghost cancellation systems referred to above all require components which sum the weighted samples and an adder or subtractor (depending on the polarity of the psuedo-ghost) to cancel the original ghost system. It is desirable to eliminate these components, if possible, to reduce the complexity of the ghost cancellation system.

U.S. Patent application No. 147,629, of which this application is a divisional application, describes a television ghost eliminator which utilizes an input-tap weighted recursive transversal filter. A video signal, which may include one or more ghost signal components, is applied to the input of the transversal filter. The video signal at the output of the transversal filter is sampled and differentiated to detect the ghost components and a reference signal derived from the main signal. The reference signal is then applied to a delay line, operated in synchronism with the transversal filter, to develop timed sampling pulses. The timed sampling pulses and the detected ghost components are applied to a plurality of memory elements which store the detected ghost elements in a timed relationship. The detected ghost elements are applied to weighting function control circuits, together with the output of the transversal filter, to control the transfer function of the transversal filter by means of input taps. The signals applied to the input taps are thus weighted as a function of the detected ghost components, and their combined effect on the transversal filter is to incrementally cancel the ghost in the video signal which is applied to the transversal filter. At no point in the system are the weighted signals combined to develop a single pseudo-ghost signal, and hence no additional summing network or adder or subtractor is needed. Complexity in the ghost eliminator is thereby reduced.

In accordance with the principles of the present invention, a ghost sampling arrangement which may be advantageously used in the above-described television ghost eliminator includes a gate coupled to receive a ghost contaminated video signal. The gate passes a portion of the video signal including a main signal component available for use as a training signal and its corresponding ghost signal components. The gated signal portion is applied to a differentiator, which passes a first signal corresponding to the training signal, and subsequent signals corresponding to the ghost signal components when present. A clipping limiter is coupled to receive the signals produced by the differentiator, and produces a sampling signal corresponding to the first, training signal component, to the exclusion of the ghost signal components. A serial shift register is coupled to receive the sampling signal, which passes through the shift register and appears at sequential ones of its parallel outputs. A plurality of sampling circuits each have a control input coupled to respectively different outputs of the shift register, and a signal input coupled to the output of the differentiator. The sampling circuits sample the signal at the output of the differentiator in response to the application of a sampling signal at their respective inputs, thereby developing a time sequence of samples of the differentiator output signal. These samples may be applied to weighting function circuits for the development of weighting function signals for the ghost eliminator.

Figure 1:
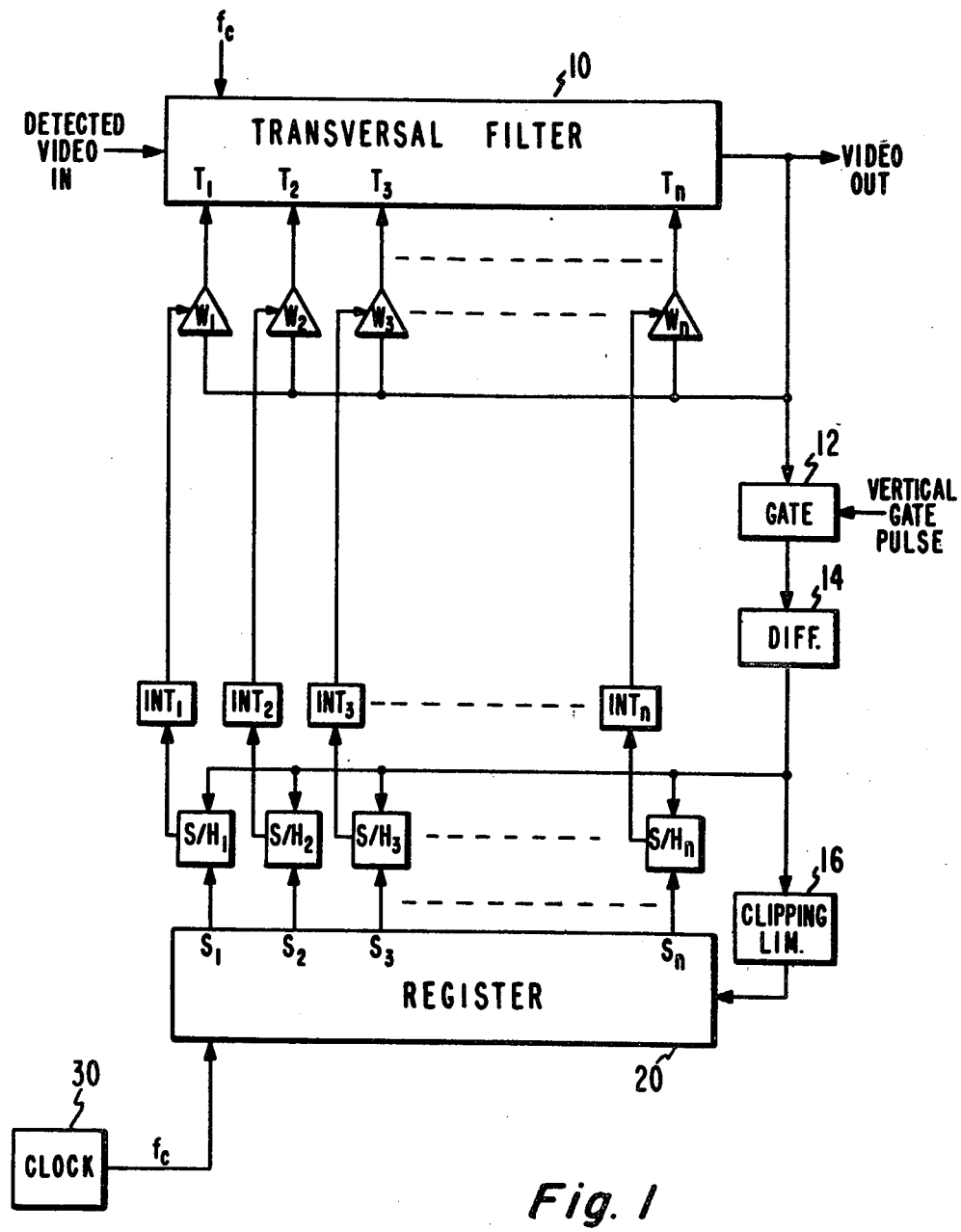
FIG. 1 illustrates in block diagram form a ghost cancellation system constructed in accordance with the principles of the present invention.

Referring to the ghost cancellation system of FIG. 1, a transversal filter 10 is shown, which receives a detected video signal which may include a ghost signal component, and produces a deghosted video signal at its output. The transversal filter may comprise, for instance, a charge-coupled device (CCD) delay line, in which the received video signal is clocked from stage to stage as it is processed for removal of the ghost signal. When a CCD delay line is used for the transversal filter 10, a clock circuit 30 is provided which produces a clock signal $f_c$.

The transversal filter 10 has a number of input taps $T_1, T_2, T_3, \ldots T_n$ coupled to individual points along the delay line. Signals present on the input taps are used to modify the transfer function of the filter as the video signal passes through it.

The video signal at the output of the transversal filter 10 is applied to inputs of weighting function circuits $W_1, W_2, W_3, \ldots W_n$, and to a gate 12. The gate 12 provides a signal of a known characteristic to a differentiator 14 for detection of a ghost signal. In the example of FIG. 1, the gated signal is the first vertical synchronizing pulse of the video signal. The gate is activated in this instance by a vertical gate pulse.

The differentiator 14 differentiates the vertical synchronizing pulse, as well as any ghost signal components which accompany it. The resulting differentiated pulses indicate the existence and relative time location of the leading and trailing edges of the vertical synchronizing pulse and ghost signals that were passed by gate 12. The differentiated pulses are applied to inputs of sample-and-hold circuits $S/H_1, S/H_2, S/H_3, \ldots S/H_n$ and to a clipping limiter 16.

The clipping limiter 16 clips the differentiated pulses at a level just below the peak of the differentiated edge of the vertical synchronizing pulse and produces an amplified replica of the clipped portion of that pulse. This replica of the vertical synchronizing pulse is used as a reference pulse for timing the operation of the sample-and-hold circuits through a shift register 20.

The shift register 20 has a clocked propagation delay time equal to that of the transversal filter delay line 10. The shift register also has the same number and spacing of taps as that of the transversal filter. Shift register 20 is clocked by the same clock signal $f_c$ as the transversal filter. As the reference pulse is clocked down the shift register 20, it activates the sample-and-hold circuits to sample the differentiated ghost signals which are applied to the other inputs of the sample-and-hold circuits. The sample-and-hold circuits (and integrators) will therefore retain time sequential sampled values of the gated and differentiated ghost signals.

The samples held by the sample-and-hold circuits are applied to respective individual inputs of the weighting function circuits $W_1$-$W_n$ by way of respective integrators $INT_1, INT_2, INT_3, \ldots INT_n$ to regulate the magnitude of the transversal filter output signal which is fed back to each input tap of the transversal filter. The transversal filter output signal is effectively multiplied by each integrated weighting function signal, and the resulting input tap signals are then used to modify the transfer function imparted to the detected video signal by the transversal filter. As the detected video signal travels through the transversal filter, it is incrementally modified by the input tap weighting function signals so that the output signal summed at the output of the transversal filter will have the ghost signals removed. The ghost signals will be virtually completely eliminated after the transversal filter output signal has been repeatedly sampled by the gate signal and the integrators have settled to their final values for a steady-state ghost signal.

Figure 3:
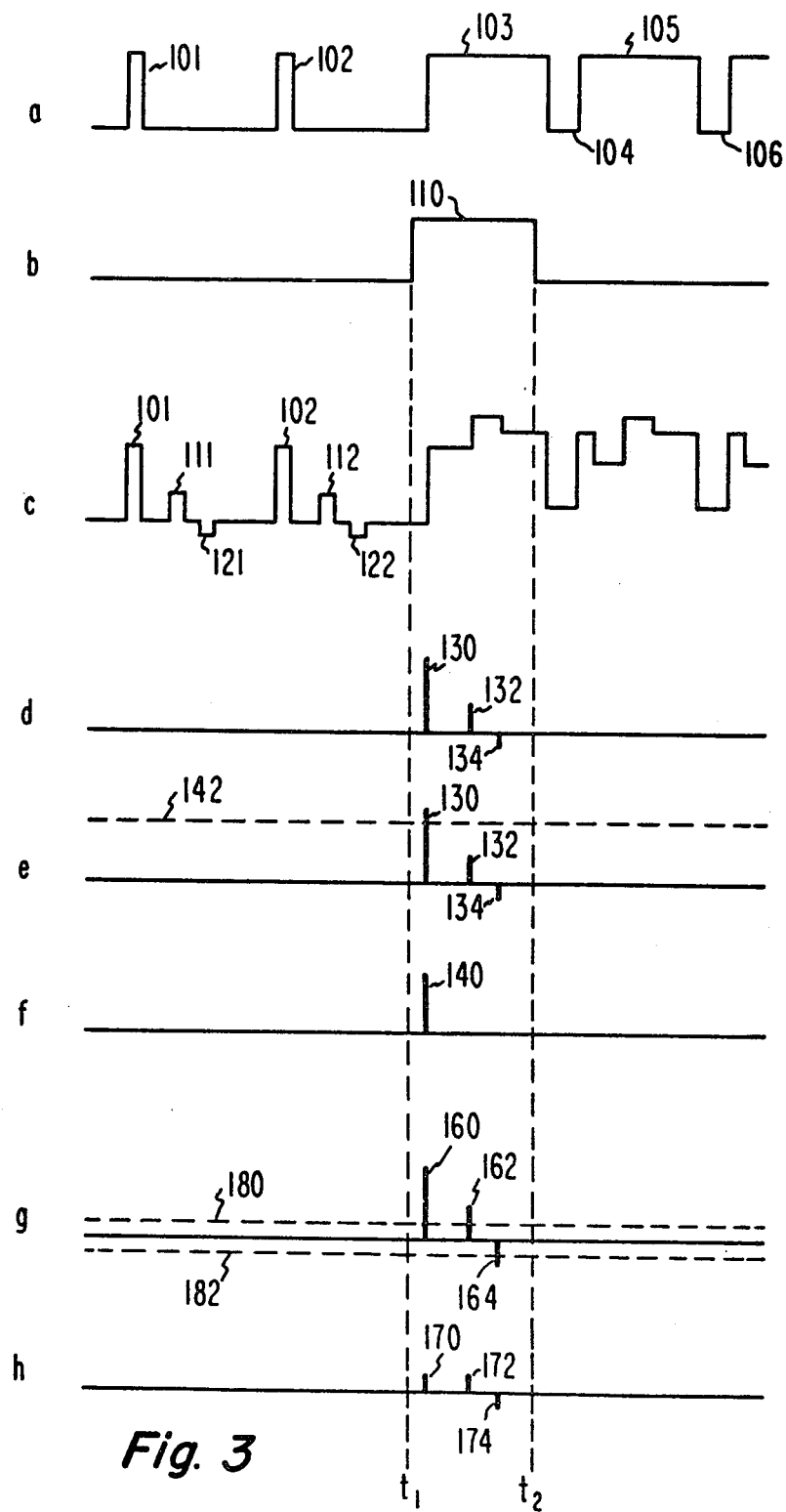
FIG. 3 illustrates waveforms depicting the operation of the ghost cancellation systems of FIGS. 1 and 2.

A typical synchronizing signal which is applied to gate 12 is shown in FIG. 3a. This signal includes equalizing pulses 101 and 102, followed by vertical synchronizing pulses 103 and 105, each of which is followed by serration pulses 104 and 106. The signal shown in FIG. 3a is a clean pulse; that is, it contains no ghost signal components.

The vertical gate pulse 110 which is applied to gate 12 is shown in FIG. 3b. The exact timing of this pulse is not critical. It is only necessary, for the embodiment shown in FIG. 1, that the pulse 110 begins prior to the leading edge of vertical synchronizing signal 103 which is to be sampled, and end prior to the occurrence of the succeeding serration pulse 104. The pulse 110 should have a duration which is at least equal to the delay time of the transversal filter 10 to effect maximum ghost cancellation.

A synchronizing signal containing ghost signal components is shown in FIG. 3c. Equalizing pulse 101 is succeeded by a positive ghost signal 111 and a negative ghost signal 121. Likewise, equalizing pulse 102 is succeeded by ghost signals 112 and 122. The vertical synchronizing pulses are similarly distorted by vertical sync ghost signals. The portion of the first vertical synchronizing pulse which occurs during the gate pulse interval $t_1-t_2$ is bounded by dashed lines, and is the signal supplied to the differentiator 14 by the gate 12. After differentiation, the leading edge of the main vertical synchronizing pulse appears as a differentiated pulse 130, shown in FIG. 3d, and edges of the ghost signal components appear as differentiated pulses 132 and 134. These differentiated pulses are applied to the sample-and-hold circuits and to the clipping limiter 16. The clipping limiter 16 has a clipping threshold 142, shown in FIG. 3e, and produces at its output the reference pulse 140, shown in FIG. 3f. Pulse 140 is shifted through register 20 to sample and hold the ghost pulses 132 and 134 in a timed relationship. The differentiator 14 is constructed so that the pulses 132 and 134 are of sufficiently short duration so that they will be sampled and held in only one sample-and-hold circuit, respectively.

The maximum delay time (with respect to the main signal) of ghosts which may be cancelled by the ghost cancellation system of FIG. 1 is determined by the delay time of the transversal filter 10. This in turn is determined by the number of stages of the CCD delay line, the clock frequency $f_c$, and the bandwidth of the applied video signal. The applied video signal in the NTSC system has a bandwidth of 4.2 MHz. Thus, according to the Nyquist sampling theory, the frequency of the clock signal $f_c$ must be at least 8.4 MHz in order to recover the highest frequency components of the video signal. A clock signal frequency of 10.7 MHz was accordingly chosen for the clock signal $f_c$. The vertical synchronizing pulse has a duration which is slightly less than the duration of one-half of a video line, of approximately 27 μsec. At a clock rate of 10.7 MHz, 290 elements are required for the CCD delay line to cancel ghosts appearing within approximately one-half line of the main signal image. Illustratively, 256 elements may be used in the CCD delay line to achieve ghost cancellation for ghost delays approaching one-half line. Since many of the expected ghost images occur within this delay range, 256 elements have been found to produce satisfactory ghost cancellation. The clock frequency of 10.7 MHz in combination with the number of CCD elements allows cancellation of ghosts within the horizontal resolution of the television image.

When a CCD delay line is used for the transversal filter 10 having 256 elements, it follows that n is 256 for this particular embodiment, and that the embodiment of FIG. 1 will have 256 input taps, 256 weighting function circuits, 256 sample-and-hold circuits and integrators, and that the shift register 20 has 256 stages. The values of the sample-and-hold circuits are updated each vertical blanking interval when a new vertical synchronizing pulse is sampled. These sample values are integrated and the ghost signal components appearing in the deghosted output signal are reduced as the integrators and the weighting function signals achieve their final values. Ghost signal component amplitudes which are reduced at least 36 db below the level of the desired video signal are considered satisfactory.

Figure 4:
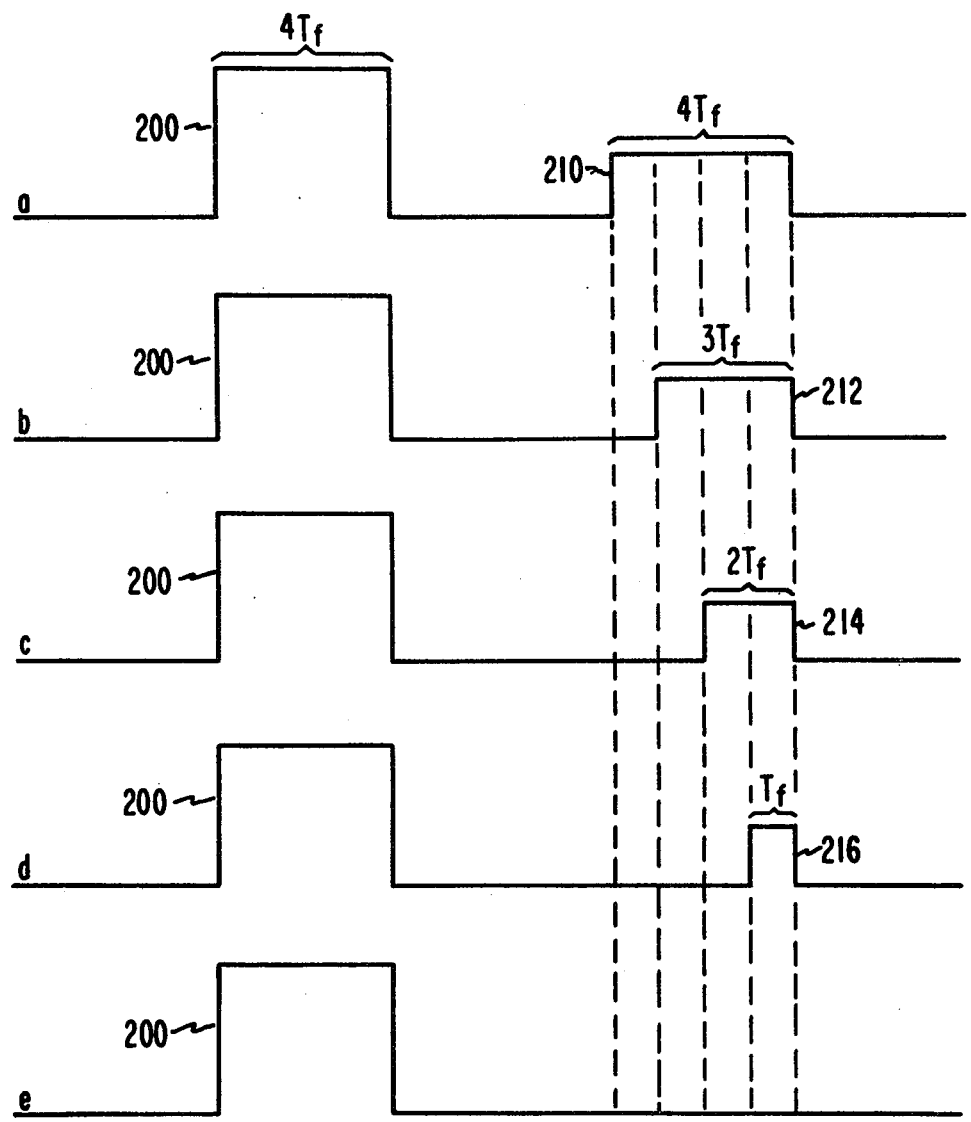
FIG. 4 illustrates waveforms which are used to explain the theory of operation of a ghost cancellation system of the present invention.

The theory of operation which underlies the incremental cancellation of the ghost signals by the weighted input taps of the transversal filter is explained by referring to the waveforms of FIG. 4. In this theoretical example, it is assumed that the video signal has a bandwidth of $4/T_f$, and that the transversal filter has four equally spaced elements and taps, clocked at a frequency of $1/T_f$. It is further assumed that the loop gain of the taps is approximately one, and that the system is stable (does not oscillate) at this loop gain value. A square wave video signal 200 in FIG. 4a has a given duration of $4T_f$, and its ghost 210 has a like duration, delayed from signal 200 by more than $4T_f$. The system is further assumed to be nonbandwidth limited. The progressive appearance of the main and ghost signals at each tap location for this theoretical system is shown in FIGS. 4b through 4e.

In FIG. 4b, the effect of the first tap is seen to be the reduction of the time duration of the ghost signal to three time intervals, or $3T_f$, as shown by ghost signal 212. The signal is then clocked to the second delay line element, at which the effect of the second tap is seen to be the reduction of the ghost signal to two time intervals 2$T_f$, as shown by ghost 214 in FIG. 4c. The signal is clocked to the third delay line element, at which the effect of the third tap is seen to be the reduction of the ghost to one time interval $T_f$, as shown by ghost 216 in FIG. 4d. Finally, the signal is seen to be completely deghosted when the effect of the fourth tap is applied at the fourth delay line element, as shown in FIG. 4e.

It is to be pointed out that this example is a theoretical explanation of the implementation of the principles of the present invention. In an actual embodiment of the present invention, it is the sum of all the weighted tap functions which effect ghost cancellation, and the actual form of the ghost signal at any one tap location may not be precisely predicted by the theoretcial example given above. The ghost signal is dynamically reduced through modification of the transfer function of the transversal filter.

Figure 2:
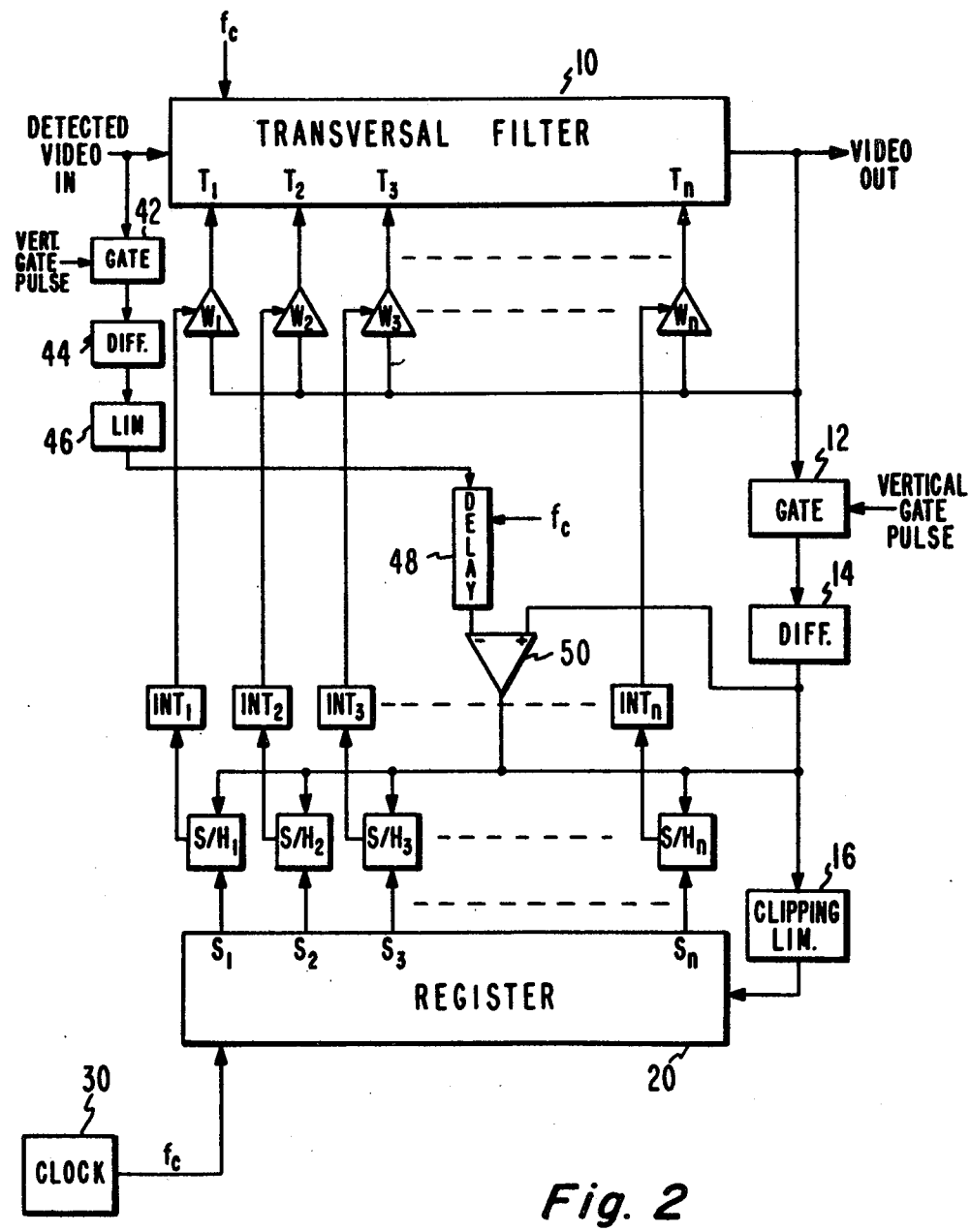
FIG. 2 illustrates, in block diagram form, a further embodiment constructed in accordance with the principles of the present invention.

An alternate embodiment of the ghost reduction system of FIG. 1 is shown in FIG. 2, in which like components bear the same reference numerals. In FIG. 2, a gate 42 and a differentiator 44 operate in the same manner as gate 12 and differentiator 14, respectively. The differentiator 44 produces differentiated pulses 160, 162, and 164 in response to the video signal of FIG. 3c, illustratively shown in FIG. 3g. These differentiated pulses correspond to pulses 130, 132, and 134 in FIG. 3e, respectively. The differentiated pulses are applied to a symmetrical limiter 46, having thresholds 180 and 182. The differentiated pulses appear at the output of the limiter 46 with amplitudes limited to the limiter thresholds, as shown by respective pulses 170, 172, and 174 in FIG. 3h. Since these differentiated and limited pulses lead their counterparts at the output of differentiator 14 by the delay time of the transversal filter, they are next delayed by a delay line 48, so that the pulses 170, 172, and 174 are in respective time coincidence with pulses 130, 132, and 134. The pulses 170, 172, and 174 are subtracted from their counterpart pulses 130, 132, and 134 by a comparator 50 and applied to the sample-and-hold circuits. The pulses thus applied to the sample-and-hold circuits are of the same amplitude relationship as pulses 130, 132, 134, but are equally amplitude reduced by the pulses 170, 172, and 174. The effect of this amplitude reduction is to improve the signal-to-noise performance of the system, since signal levels approaching the noise level of the system are subtracted from the pulses which are applied to the sample-and-hold circuits. The balance of the embodiment of FIG. 2 operates in the same manner as the ghost cancellation system of FIG. 1.

As previously mentioned, the transversal filter of FIG. 1, as well as that of FIG. 2, may comprise a charge coupled device (CCD) delay line, such as that described in the article "Digitally-Controlled And Electrically-Programmable CCD Transversal Filter LSI", published in the *Proceedings of 5th Internation Conference on Charge-Coupled Devices* (1979) at page 222, et seq., and in U.S. Pat. No. 4,158,209. A typical input tap for a CCD delay line is illustrated by gate G2 in FIG. 1 of U.S. Pat. No. 4,158,209, and by the control gates shown in FIG. 3 of the aforementioned article appearing on page 227 of the *Proceedings*.

What is claimed is:

1. In a television ghost signal cancellation system, including a delay line having a plurality of taps connected to a plurality of weighting function circuits, wherein control of the weighting functions developed by said circuits determines the response characteristic of a transversal filter employing said delay line; an arrangement for detecting the presence of a television ghost signal and its time of occurrence with respect to a reference signal comprising:

a source of video signals including a main signal which may be subject to contamination by a ghost signal, and including a main signal component available for use as a training signal, and its corresponding ghost signal components when said video signals are subject to said contamination;

means, having an input coupled to said video signal source, and an output, for passing a first signal corresponding to said training signal and subsequent signals corresponding to its ghost signal components, when present;

means, having an input coupled to said signal passing means for producing a sampling signal in response to said first signal corresponding to said training signal to the exclusion of said subsequent signals corresponding to its ghost signal components;

a serial shift register having an input coupled to receive said sampling signal, and parallel outputs, at which said sampling signal successively appears as it passes through said shift register;

a plurality of sampling circuits, each having a control input coupled to a respectively different output of said shift register, and a signal input coupled to the output of said signal passing means, and an output, wherein each of said sampling circuits samples the signal appearing at the output of said signal passing means at the respective time of application of said sampling signal to its control input; and means for coupling the respective outputs of said sampling circuits to respective ones of said weighting function circuits for the development of said weighting functions.

2. The television ghost signal cancellation system of claim 1, wherein the amplitude of said first signal corresponding to said training signal exceeds the amplitudes of said subsequent signals corresponding to its ghost signal components; and wherein said sampling signal producing means comprises an amplitude responsive circuit which produces a sampling signal in response to said first signal, and does not respond to said subsequent signals of amplitudes less than that of said first signal.

3. The television ghost signal cancellation system of claim 2, wherein said amplitude responsive circuit includes a clipping limiter circuit which is responsive to signals having amplitudes exceeding a given threshold level to the exclusion of signals which do not exceed said threshold level for producing a sampling signal suitable for use by said shift register.

4. The television ghost signal cancellation system of claims 2 or 3, wherein said signal passing means comprises a gate circuit responsive to a gating signal for passing said training signal, and its ghost signal components, when present, and a differentiator responsive to said gated signals for producing differentiated signals representative of the time of occurrence of transitions of said training signal and its ghost signal components.

5. The television ghost signal cancellation system of claim 4, wherein said sampling circuits comprise sample and hold circuits, each of which is responsive to the application of said sampling signal to the associated control input for sampling the value of the signal then appearing at the output of said signal passing means, and for storing said value between successive occurrences of such sampling signal application.

6. The television ghost signal cancellation system of claim 5, wherein said weighting function circuits each have a first input for receiving one of said stored values, and a second input coupled to receive said video signals and an output at which a weighting function signal representative of said video signals as modified by said stored value is produced.

* * * * *